United States Patent [19]

Miyashita et al.

[11] Patent Number: 5,162,973
[45] Date of Patent: Nov. 10, 1992

[54] TERMINAL ELECTRODE FILMS FOR LAMINATION CAPACITOR AND METHOD FOR MANUFACTURING

[75] Inventors: Tomonaga Miyashita, Ukyo; Mitsuo Kawamura, Sagamihara, both of Japan

[73] Assignee: Rohm Co., Ltd., Kyoto, Japan

[21] Appl. No.: 803,489

[22] Filed: Dec. 4, 1991

[51] Int. Cl.[5] .................. H01G 7/00; H01G 1/14; H01G 4/30
[52] U.S. Cl. .................. 361/308; 29/25.42; 361/321
[58] Field of Search .............. 361/308, 309, 310, 320, 361/321, 328, 329, 330; 29/25.42

[56] References Cited

U.S. PATENT DOCUMENTS

| | | | |
|---|---|---|---|
| 4,458,294 | 7/1984 | Womack | 361/321 |
| 4,555,746 | 11/1985 | Mochizuki et al. | 361/323 |
| 4,811,162 | 3/1989 | Maher et al. | 361/308 |
| 4,881,308 | 11/1989 | McLaughlin et al. | 29/25.42 |
| 4,982,485 | 1/1991 | Nakaya et al. | 29/25.42 |
| 5,021,921 | 6/1991 | Sano et al. | 361/321 |

Primary Examiner—Donald A. Griffin
Attorney, Agent, or Firm—Morrison Law Firm; Thomas R. Morrison

[57] ABSTRACT

First and second pluralities of interleaved electrodes 12, 13 are disposed in a ceramic main body part, with ends of the first plurality of electrodes 12 exposed at a first side 11a of the main body part 11, and ends of the second plurality of electrodes 13 exposed at a second side 11b of the main body part 11. A plurality of the main body parts 11 are placed in a jig 15 with only their first sides 11a exposed. The remaining sides are shielded by the jig, and by contact with adjacent main body parts. A metal 14a having good adhesion to ceramic such as chromium is coated on the first sides 11a. Because of the packing of the main body parts in the jig, only first sides 11a are coated—the remaining sides remain free of the coating material. The above coating step is followed by coating with two further layers, a soldering-heat-resistant metallic layer 14b, and a solder-receptive metallic layer 14c. The main body parts are reversed in the jig 15 to expose the second sides 11b, while shielding all other sides. The three coating steps are repeated.

7 Claims, 5 Drawing Sheets

TERMINAL ELECTRODE FILMS FOR LAMINATION CAPACITOR AND METHOD FOR MANUFACTURING

BACKGROUND OF THE INVENTION

The present invention relates to the structure and method for forming connector terminal electrode films of a lamination capacitor on the side of a ceramic main body part and connected to internal electrodes inside the main body part.

Referring to FIGS. 1 and 2, a lamination capacitor consists of a parallelepiped ceramic main body part 1 containing first and second pluralities of internal electrodes 2 and 3 arranged in alternating layers. Internal electrodes 2 are displaced in main body part 1 such that they are exposed at a face 1a. Similarly, internal electrodes 3 are displaced in main body part 1 such that they are exposed at a face 1b. A connector terminal electrode film 4 is coated on face 1a of main body part 1 to make contact with the exposed ends of internal electrodes 2. A similar terminal electrode film 4 is coated on face 1b of main body part 1 to make contact with the exposed ends of internal electrodes 3.

Japanese Unexamined Patent Publication No.SHO 60-236207 (236207/1985) discloses a three-layer structure having terminal electrode films 4 affixed by conductive adhesive to faces 1a and 1b to form first electrode layers 4a. A second electrode layer 4b of a solder-heat-resistant metal such as, for example, nickel or copper, is coated on a surface of first electrode layer 4a by any convenient method such as, for example, sputtering, vacuum evaporation or plasma spray coating. A third electrode layer 4c of a soft-solderable metal such as, for example, tin or silver, is coated on a surface of second electrode layer 4b by any convenient method such as, for example, sputtering, vacuum evaporation or plasma spray coating.

Since first electrode layer 4a of terminal electrode film 4 is affixed by coating conductive paste directly onto the faces 1a and 1b of the main body part 1, the thickness of the first electrode layer 4a of conductive paste is relatively large and not uniform. Thus the length L of a lamination capacitor is increased and its dimensional uniformity is poor.

Besides coating conductive paste on faces 1a, 1b of the main body part 1, the conductive paste also coats the top 1c, bottom 1d and the left and right sides 1e, 1f of the main body part 1. It is difficult to maintain a constant thickness of conductive paste on these top 1c, bottom 1d, left 1e and right sides 1f. Thus, the height H and width W of a lamination capacitor made according to the prior art are larger than necessary and the dimensional precision of these dimensions is not as precise as desired.

A part of the relatively thick terminal electrode film 4 extends over the top 1c, bottom 1d, left 1e and right sides 1f of the main body part 1. Thus when a lamination capacitor is held by a vacuum collet for automatic installation onto a printed board of an electrical appliances the present of the thick terminal electrode film 4, extending to the top surface 1c of the main body part 1, sometimes interferes proper manipulation of the lamination capacitor by the vacuum collet.

Because of the manner in which coating must be done, terminal electrode films 4b and 4c generally cover most, of not all, of main body part 1. In order to make the device useful, the unwanted material must be removed from sides 1c–1f by, for example, etching. This adds substantially to the cost of manufacture, and to the scrap rate.

SUMMARY OF THE INVENTION

Accordingly, it is an object of the invention to provide a lamination capacitor which overcomes the drawbacks of the prior art.

It is a further object of the invention to provide a lamination capacitor having thinner, and more uniform electrode terminals.

It is a still further object of the invention to provide a lamination capacitor wherein a first metallic electrode terminal layer, having good adhesion to ceramic, is coated directly on a main body part. An intermediate metallic electrode terminal layer, and a final metallic electrode terminal layer are coated on the first metallic electrode terminal layer.

It is a still further object of the invention to provide a lamination capacitor, and a method for forming same, wherein metallic coatings of metallic electrode terminal layers are confined to opposed electrode surfaces.

Briefly stated, the present invention provides first and second pluralities of interleaved electrodes disposed in a ceramic main body part, with ends of the first plurality of electrodes exposed at a first side of the main body part, and ends of the second plurality of electrodes exposed at a second side of the main body part. A plurality of the main body parts are placed in a jig with only their first sides exposed. The remaining sides are shielded by the jig, and by contact with adjacent main body parts. A metal having good adhesion to ceramic, such as chromium, is coated on the first sides. Because of the packing of the main body parts in the jig, only the first sides are coated—the remaining sides remain free of the coating material. The above coating step is followed by coating with two further layers, a soldering-heat-resistant metallic layer, and a solder-receptive metallic layer. The main body parts are reversed in the jig to expose the second sides, while shielding all other sides. The three coating steps are repeated.

According to an embodiment of the invention, there is provided A lamination capacitor comprising: a ceramic main body part, the ceramic main body part including opposed first and second sides, a first plurality of internal electrodes in the main body part, the first plurality of internal electrodes being exposed at the first side, a second plurality of internal electrodes in the main body part, the second plurality of internal electrodes being interleaved with the first plurality of internal electrodes, the second plurality of internal electrodes being exposed at the second side, a first metallic electrode terminal layer of a metal highly adhesive to ceramic coated on the first side, a second metallic electrode terminal layer coated on the first metallic electrode terminal layer, the second metallic electrode terminal layer being of a metal capable of withstanding heat of soldering, a third metallic electrode terminal layer coated on the second metallic electrode terminal layer, the third metallic electrode terminal layer being of a metal that is receptive to soldering, a fourth metallic electrode terminal layer of a metal highly adhesive to ceramic coated on the second side, a fifth metallic electrode terminal layer coated on the fourth metallic electrode terminal layer, the fifth metallic electrode terminal layer being of a metal capable of withstanding heat of soldering, a sixth metallic electrode terminal layer coated on the fifth metallic electrode terminal layer, and the sixth metallic electrode terminal layer being of a metal that is receptive to soldering.

According to a feature of the invention, there is provided A method for making a lamination capacitor, comprising: forming a plurality of ceramic main body parts having first and second pluralities of interleaved internal electrodes therein, the step of forming including exposing surfaces of the first plurality of internal electrodes at a first side of the main body part, the step of forming further including exposing surfaces of the second plurality of internal electrodes at a second side of the main body part, opposed to the first side, forming a jig having at least one groove therein, the at least one groove having a depth substantially equal to a distance between the first and second sides, the at least one groove having a width substantially equal to a transverse dimension of the ceramic main body part, installing the plurality of main body parts in the groove, with adjacent surface of the main body parts tightly fitted together, and with the first side exposed, coating a first layer of a metal having an adhesive affinity to ceramic on the exposed first sides of all of the main body parts, coating a second layer of a metal capable of withstanding heat of soldering over the first layer, coating a third layer of a metal receptive to soldering over the second layer, inverting the plurality of main body parts in the groove, whereby the second sides are exposed, and repeating the three coating steps above to form a three-layer metallic terminal on the second side.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
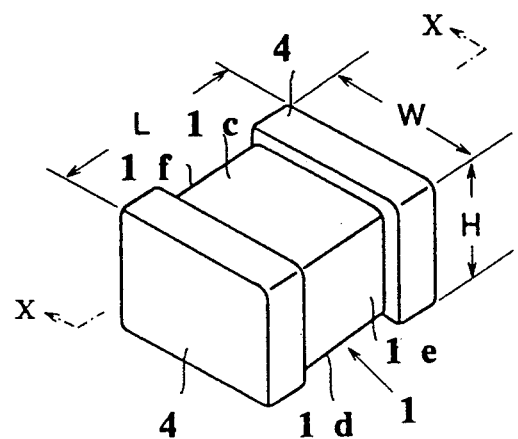
FIG. 1 is a perspective view of a lamination capacitor according to the prior art.
Figure 2:
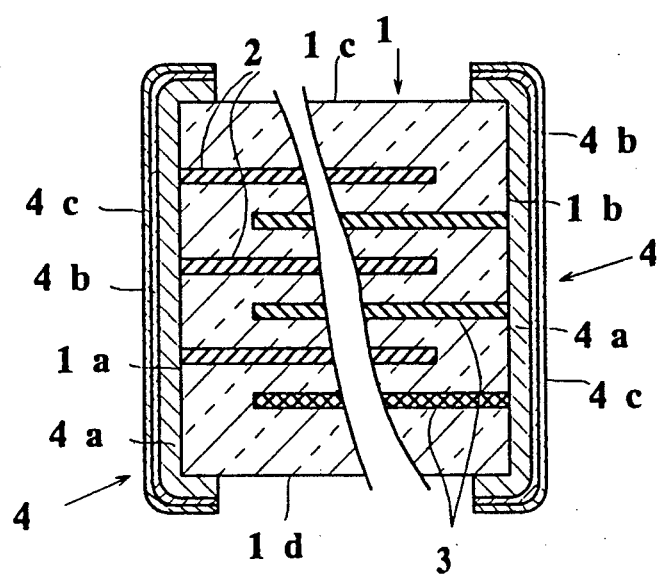
FIG. 2 is a section taken along X—X of FIG. 1.
Figure 3:
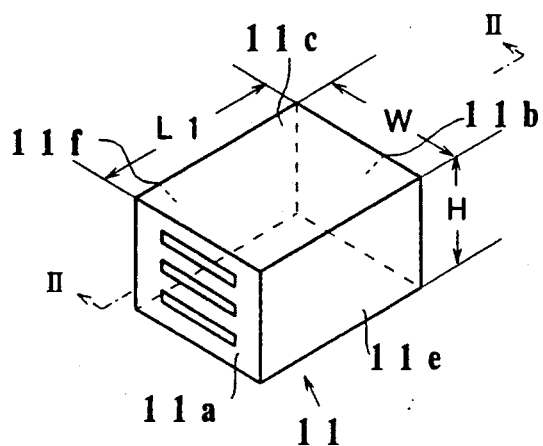
FIG. 3 is a perspective view of a main body part according to an embodiment of the invention.
Figure 4:
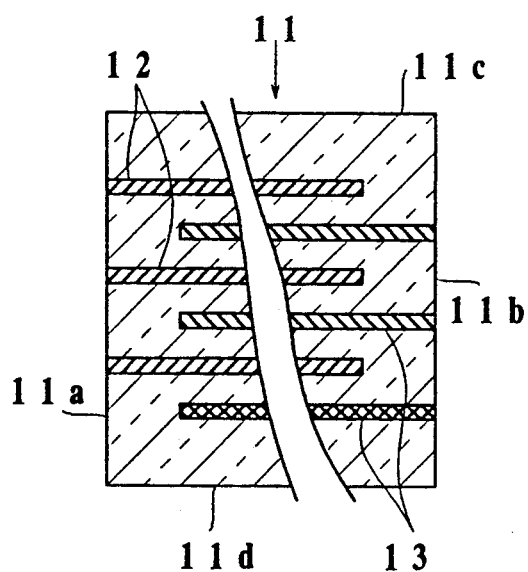
FIG. 4 is a section taken along II—II in FIG. 3.

The inventors of the present invention conducted a number of experiments to attempt to coat metal directly onto a ceramic surface by sputtering, vacuum evaporation or plasma spray coating. It turned out that when a solder-heat-resistant metal such as, for example, nickel or copper was coated first on the surface of ceramic by sputtering, vacuum evaporation or plasma spraying, the adhesion of the metal to the ceramic surface was so low that the metal came off easily.

However, when a metal with good adhesion properties to the ceramic surface such as, for example, chromium, is coated on the ceramic surface first by sputtering, vacuum evaporation or plasma spray coating, then a solder-heat-resistant metal such as nickel or copper, is coated over the chromium layer by sputtering, vacuum evaporation or plasma spray coating, it is found that the tendency of the metal to peel from the device is absolutely prevented. This discovery led to the present invention.

Referring to FIGS. 3 through 10, a main body part 11 of a lamination capacitor is bounded by a front side 11a, a rear side 11b, an upper side 11c, a lower side 11d, right side 11e and a left side 11f. A plurality of internal electrodes 12 are disposed in main body part 11, displaced to on one side thereof. A second plurality of internal electrodes 13 are interleaved with internal electrodes 12, and are displaced to the second side of main body part 11. Internal electrodes 12 are exposed at front side 11a. Internal electrodes 13 are exposed at rear side 11b.

Figure 7:
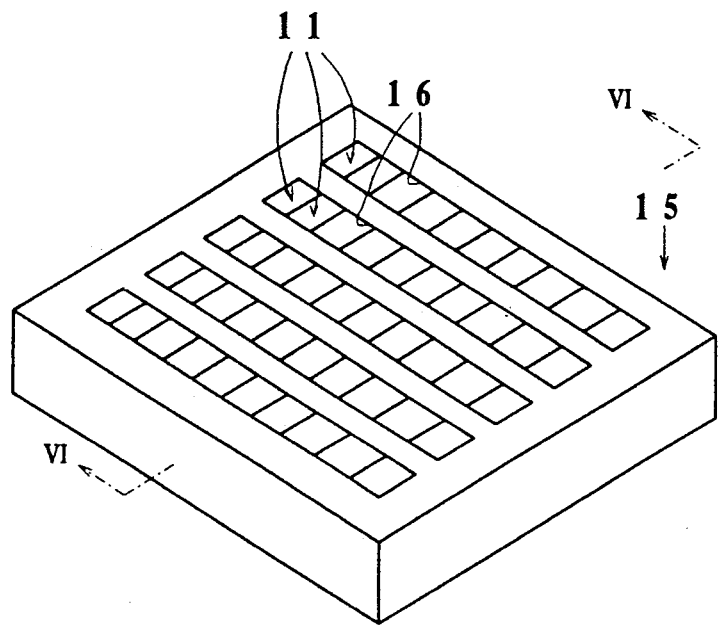
FIG. 7 is a perspective view of the jig of FIG. 5 with a plurality of main body parts arranged in grooves.
Figure 8:
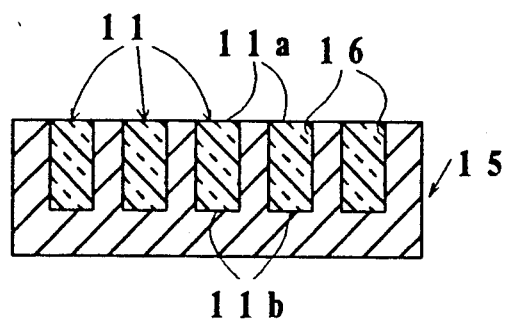
FIG. 8 is a section taken along VI—VI of FIG. 7.
Figure 9:
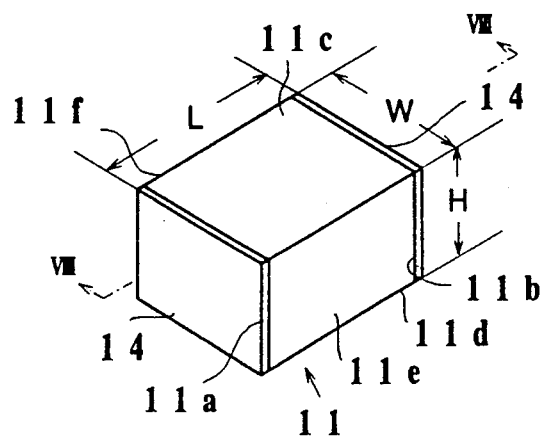
FIG. 9 is a perspective view of a lamination capacitor according to an embodiment of the invention.

Referring specifically to FIGS. 7 and 8, a jig 15 holds a plurality of main body parts 11 while a multilayer terminal electrode film 14 is sputtered, or otherwise coated, on one of their front or rear sides 11a, 11b to make electrical contact with internal electrodes 12 or 13. After the terminal electrode film is formed on one end of the plurality of main body parts 11, the main body parts are reversed in jig 15 which holds them while a multilayer terminal electrode film is formed on the remaining side, has a plate shape and is made of a material such as quartz.

Figure 5:
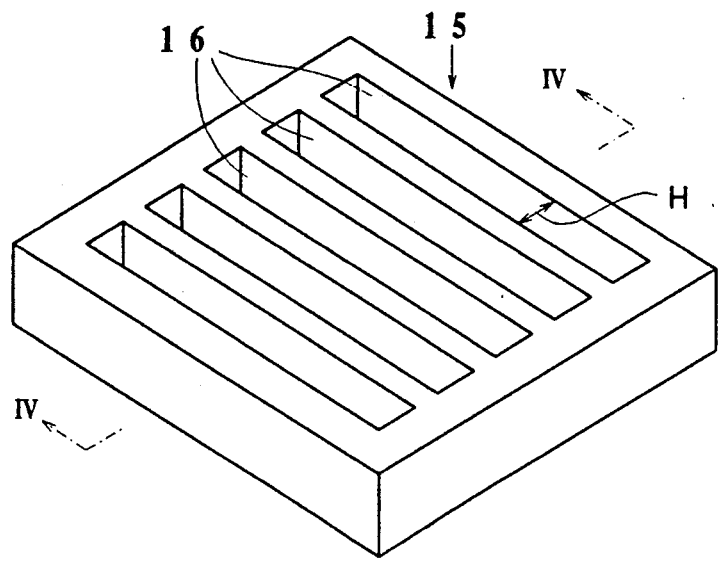
FIG. 5 is a perspective view of a jig according to an embodiment of the invention.
Figure 6:
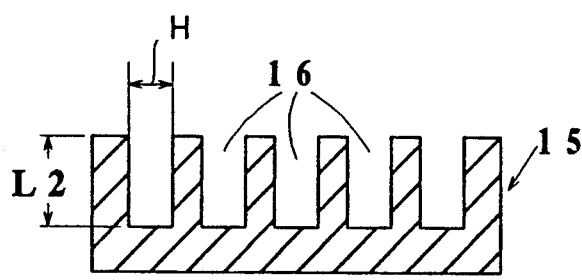
FIG. 6 is a section taken along IV—IV in FIG. 5.

Referring now to FIGS. 5 and 6, a plurality of long grooves 16 are formed in one surface of jig 15. Grooves 16 have the same width H as the height of main body part 11. Jig 15 is preferably made of quartz.

Referring to FIGS. 7 and 8, a plurality of main body parts 11 are arranged into grooves 16 with front side 11a facing up and right and left sides 11e and 11f in close contact with each other (it is also possible to arrange a plurality of main body parts with front sides 11a facing up and upper and lower sides 11c and 11d next to each other by making the width of groove 16 equal to the width W of main body part 11).

With the depth L2 of grooves 16 equal to the length L1 of main body part 11 before forming the terminals, and with the main body parts tightly packed together in grooves 16, only the upward-facing one of front and rear sides 11a and 11b of main body parts 11 are exposed. Jig 15, with the array of main body parts installed therein, is set into a sputtering machine which sputters the first electrode layer 14a on side 11a of main body part 11 using a metal that is highly adhesive to ceramic. In the preferred embodiment, chromium is employed for first electrode layer 14a.

A second electrode layer 14b is sputtered onto first electrode layer 14a. Second electrode layer is a metal that can withstand the temperature of soldering. Nickel or copper is preferred in second electrode layer 14b. A third electrode layer 14c is coated on second electrode layer 14b. Third electrode layer 14c is preferably a metal providing a willing host to solder such as, for example, tin or silver.

Figure 10:
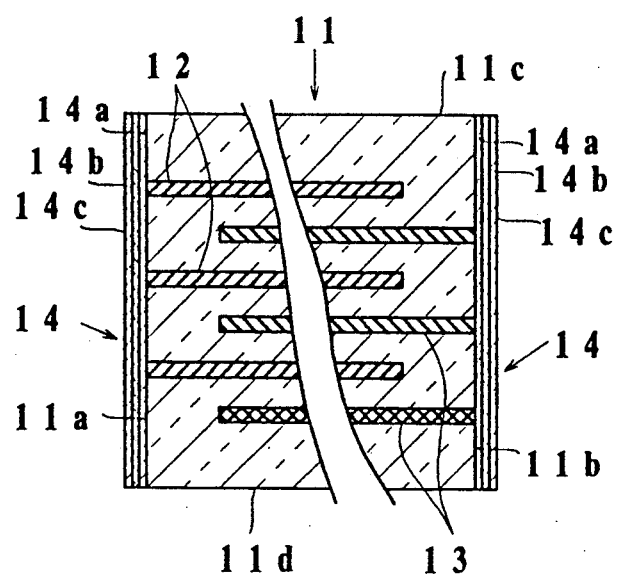
FIG. 10 is a section taken along VIII—VIII of FIG. 9.

As shown in FIG. 10, front side 11a of main body part 11 has a three-layer electrode 14 comprising first layer 14a of chromium that is highly adhesive to ceramic, second layer 14b of nickel or copper that is solder-heat resistant, and third layer 14c of tin or silver that is soft-solderable.

After terminal electrode film 14 is formed on side 11a, each of main body parts 11 in groove 16 of jig 15 is turned upside down so that rear sides 11b face up to receive three sputtered layers corresponding to the three layers on front side 11a.

FIG. 10 shows the final device, with both terminal electrode films 14 in place.

It is apparent that vacuum evaporation or plasma spray coating can be used instead of sputtering to form the metal layers. It is also apparent that any metal having a suitable resistance to soldering temperatures can replace nickel as second layer 14b.

Metal films formed by sputtering, vacuum evaporation or plasma spray coating can be as thin as 1 micron or less. Thus when a three-layer terminal electrode film is formed according to the present invention, the total thickness of the terminal electrode film is less than a few microns. This is much thinner than in the prior art device wherein the first electrode layer is a conductive paste. In addition, the present invention substantially improves the uniformity of thickness of the terminal electrodes, and thus improves the dimensional uniformity of the resulting lamination capacitor.

Since the three-layer terminal electrode films according to the present invention are formed only on two opposing sides of the main body part, and are completely omitted from the remaining four sides, the height and width of the main body are not increased by the addition of the terminal electrode films, in contrast to the prior art wherein a substantial increase in these dimensions, and a substantial variability in their values, is brought about by the addition of the terminal films.

As a result, the present invention provides a lamination capacitor that is not only smaller in size, but also exhibits greater precision in all of its dimensions.

In addition, since terminal electrode film 14 are completely omitted from four of the sides of the lamination capacitor, the presence of terminal electrode film 14 does not interfere with vacuum adsorption when an adsorption collet is employed to handle the lamination capacitor.

Since it is easy to form the three-layer structure of terminal electrode films 14 by sputtering, vacuum evaporation, or plasma spray coating, it is much simpler and cheaper to form terminal electrode film 14 than it true of the process disclosed in Japanese Unexamined Patent Publication No. SHO 60-236207 (236207/1985) where unwanted parts of the nickel second layer and the tin third layer must be removed by etching after these layers are formed all over the main body part by sputtering, vacuum evaporation, or plasma spray coating.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A lamination capacitor comprising:
   a ceramic main body part;
   said ceramic main body part including opposed first and second sides;
   a first plurality of internal electrodes in said main body part;
   said first plurality of internal electrodes being exposed at said first side;
   a second plurality of internal electrodes in said main body part;
   said second plurality of internal electrodes being interleaved with said first plurality of internal electrodes;
   said second plurality of internal electrodes being exposed at said second side;
   a first metallic electrode terminal layer of a metal highly adhesive to ceramic coated on said first side;
   a second metallic electrode terminal layer coated on said first metallic electrode terminal layer;
   said second metallic electrode terminal layer being of a metal capable of withstanding heat of soldering;
   a third metallic electrode terminal layer coated on said second metallic electrode terminal layer;
   said third metallic electrode terminal layer being of a metal that is receptive to soldering;
   a fourth metallic electrode terminal layer of a metal highly adhesive to ceramic coated on said second side;
   a fifth metallic electrode terminal layer coated on said fourth metallic electrode terminal layer;
   said fifth metallic electrode terminal layer being of a metal capable of withstanding heat of soldering;
   a sixth metallic electrode terminal layer coated on said fifth metallic electrode terminal layer; and
   said sixth metallic electrode terminal layer being of a metal that is receptive to soldering.

2. A lamination capacitor according to claim 1, wherein said first, second, third, fourth, fifth and sixth metallic electrode terminal layers are one of sputtered, vacuum coated or plasma sprayed layers.

3. A lamination capacitor according to claim 1, wherein a coating of said first through sixth layers is limited to said first and second sides, with substantially no coating of other surfaces of said lamination capacitor.

4. A lamination capacitor according to claim 1, wherein said first and fourth metallic electrode terminal layers are chromium.

5. A method for making a lamination capacitor, comprising:
   forming a plurality of ceramic main body parts having first and second pluralities of interleaved internal electrodes therein;
   the step of forming including exposing surfaces of said first plurality of internal electrodes at a first side of said main body part;
   the step of forming further including exposing surfaces of said second plurality of internal electrodes at a second side of said main body part, opposed to said first side;
   forming a jig having at least one groove therein;
   said at least one groove having a depth substantially equal to a distance between said first and second sides;
   said at least one groove having a width substantially equal to a transverse dimension of said ceramic main body part;
   installing said plurality of main body parts in said groove, with adjacent surface of said main body parts tightly fitted together, and with said first side exposed;
   coating a first layer of a metal having an adhesive affinity to ceramic on the exposed first sides of all of said main body parts;
   coating a second layer of a metal capable of withstanding heat of soldering over said first layer;
   coating a third layer of a metal receptive to soldering over said second layer;

inverting said plurality of main body parts in said groove, whereby said second sides are exposed; and repeating the three coating steps above to form a three-layer metallic terminal on said second side.

6. A method according to claim 5, wherein at least one of the steps of coating employs one of sputtering, vacuum coating and plasma spraying.

7. A method according to claim 6, wherein all of the steps of coating employ one of sputtering vacuum coating and plasma spraying

* * * * *